United States Patent
Tsai et al.

[11] Patent Number: 5,989,723
[45] Date of Patent: Nov. 23, 1999

[54] CONDUCTIVE POLYESTER-BASED ALLOY SHEET

[75] Inventors: Tsan Hung Tsai; Rong Shiun Pan; Cheng Chung Wu, all of Hsin-Chu; Yuan Hwey Hsu; Jen Hao Wei, both of Hsin-Chu Hsien; Shung Mine Hong, Chang-Hwa, all of Taiwan

[73] Assignee: Far Eastern Textile Ltd., Taipei, Taiwan

[21] Appl. No.: 08/857,333

[22] Filed: May 16, 1997

[51] Int. Cl.$^6$ .......................... B32B 27/20; B32B 27/30; B32B 27/32; B32B 27/36

[52] U.S. Cl. .................... 428/483; 428/515; 428/520; 428/521; 428/522; 525/88; 525/92 F; 525/92 H; 525/89; 525/90; 525/93; 525/165; 525/166; 525/175; 525/176

[58] Field of Search ................. 428/323, 500, 428/515, 517, 519, 521, 522, 520, 480, 483; 525/88, 92 F, 92 H, 89, 90, 93, 165, 175, 176, 166

[56] References Cited

U.S. PATENT DOCUMENTS

| | | | |
|---|---|---|---|
| 4,656,094 | 4/1987 | Kojima et al. | 428/412 |
| 4,704,413 | 11/1987 | Nabeta et al. | 523/137 |
| 4,983,663 | 1/1991 | Orikasa et al. | 524/504 |
| 5,115,018 | 5/1992 | Akkapeddi et al. | 525/64 |
| 5,248,553 | 9/1993 | Miyashita et al. | 428/297 |
| 5,708,079 | 1/1998 | Eichenauer et al. | 525/71 |

FOREIGN PATENT DOCUMENTS 63-299923  12/1988  Japan .

*Primary Examiner*—Vivian Chen
*Attorney, Agent, or Firm*—Rosenberg, Klein & Bilker

[57] ABSTRACT

A conductive polyester-based alloy sheet having three layers laminated together by co-extrusion, which comprises one substrate layer and two surface layers, wherein the surface layers are conductive and comprise polyester, acrylonitrile-butadiene-styrene (abbreviated as ABS) and/or polystyrene (abbreviated as PS), a compatibilizer, and a toughening agent, wherein the surface layers have a surface conductivity of not more than $10^8$ ohms. The melt flow index of the material for the conductive layers during the extrusion step is not less than 5.0 g/min (loading, 10 Kg; temperature, 250° C.). The substrate layer is made from acrylonitrile-butadiene-styrene and/or polystyrene.

1 Claim, No Drawings

CONDUCTIVE POLYESTER-BASED ALLOY SHEET

BACKGROUND OF THE INVENTION

The present invention relates to a conductive polyester-based alloy sheet having three layers laminated together co-extrusion, which has a surface resistance of not more than $10^8$ ohms, and is useful for the packaging of IC products and parts.

Recently, the package material for IC products, parts and the like has been demanded to have conductivity. Accordingly, a conductive polyester-based alloy sheet which not only has the toughness of a polyester resin but also has the heat resistance of an ABS-type or PS-type resin is now developed and provided.

SUMMARY OF THE INVENTION

The present invention is to provide a conductive polyester-based alloy sheet having three layers laminated together by co-extrusion, which comprises one substrate layer and two surface layers, wherein the surface layers which are conductive are formed by compounding polyester and/or copolyester and ABS-type and/or PS-type resins with carbon black. The conductive layers have a melt flow index higher than that of the substrate layers and tend to diffuse toward the edge of the sheet, and the substrate layer is form by polyester and/or copolyester and/or ABS-type and/or PS-type resins.

The conductive polyester-based alloy sheets prepared according to the present invention not only have superior conductivity but also have so good mechanical strength as that of polyester. Because the conductive layers contain ABS-type or PS-type resin, the heat resistance can be elevated to above 85° C. and the advantages of polyester and ABS-type or PS-type resins are enjoyed. The conductive sheets are particularly suitable for the packaging of IC products and parts. The surface resistance of the sheet according to the present invention is not more than $10^8$ ohms.

DETAILED DESCRIPTION OF THE PREFERRED EMBODIMENT

In the present invention, the carbon black added to each conductive layer are in the amount ranging from 3 to 25 wt %, and preferably from 9 to 20 wt %. Examples of carbon black which can be used in the conductive layers may contain furnace black and channel black, for example, XC-72 (manufactured by Cabot Co., Ltd.) and Ketjen Black EC (manufactured by Akzo Co., Holland).

The total thickness of one conductive sheet according to the invention may range from 0.1 to 1.2 mm, preferably from 0.1 to 1.0 mm. The melt flow index of the conductive pellets produced according to the invention is greater than 5.0 g/10 min (loading, 10 Kg; temperature, 250° C.). In the pellets, the proportion of (polyester+copolyester) to (ABS-type+PS-type) is between 0.001–999, preferably between 0.067–1.5. In the production of the conductive polyester-based alloy sheet according to the invention, two extruders are used to form the sheet by co-extrusion. Temperatures for the production are: screw barrel, 210–250° C.; die head, 230–260° C. The temperature for vacuum molding (or pressure molding) the sheet is 130–160° C.

Polyester are originally not compatible with an ABS-type or PS-type resin. In order to obtain a good compatibility, an appropriate compatibilizer must be incorporated. In this invention, a compatibilizer such as EGMA-g-AS-type, PS-PMMA and 1,4-cyclohexane dimethanol dibenzoate in an appropriate amount is used, and the softening point thereof is 30–120° C. Such compatibilizer can also acts as a dispersing assistant agent and is incorporated in an appropriate amount of between 0.1–30 wt %.

In order to improve the impact strength and modify the relative flowability of the polyester and ABS-type or PS-type resins, a toughening agent selected from SBS (styrene-butadiene-styrene) and SEBS (styrene-ethylene-butadiene-styrene) and thermoplastic polyester elastomers is added according to the present invention in an amount of between 0.1–20 wt %.

Specifically, in the present invention the surface layers each consist of:

(a) 99.9–0.1 wt % of a crystalline or non-crystalline polyester or copolyester resin;

(b) 0.1–30 wt % of a acrylonitrile-butadiene-styrene copolymer or polystyrene;

(c) 0.1–20 wt % of a compatibilizer, based on the weight of (a)+(b);

(d) 0.1–20 wt % of a toughening agent, based on the weight of (a)+(b); and (e) 3–25 wt % of carbon black, based on the weight of (a)+(b).

The thickness of the sheet produced according to this invention is 0.1–1.2 mm, and the total thickness of the two surface layers may range from 2 to 80%, preferably from 3 to 35%, of the total thickness of the sheet which having three layers. The polyester used in this invention is a monomer linked to a polyester such as, for example, polybutylene-terephthalate, polyethylene-terephthalate, polycyclohexane-dimethylene-terephthalate, and the copolyester used in this invention is synthesized by reacting a diol with a dicarboxylic acid, wherein:

(a) the diol is selected from the group consisting of ethanediol, 1,4-butanediol, 1,5-pentanediol 1,6-hexanediol diglycol, 1,4-dimethylol-cyclohexane, 3-methyl-pentanediol, and 2-methyl-hexanediol; and (b) the dicarboxylic acid is selected from the group consisting of: malonic acid, succinic acid, glutaric acid, adipic acid, pimelic acid, suberic acid, azelaic acid, sebacic acid, cyclohexanecarboxylic acid, terephthalic acid, and isophthalic acid.

In the process for preparing the conductive polyester-based alloy pellets, said polyester and/or copolyester and acrylonitrile-butadiene-styrene and/or polystyrene, compatibilizer, toughening agent and carbon black are respectively metered into a extruder with twin-screw, melted, pelletized, and then a conductive polyester-based sheet is formed by co-extrusion.

The invention are further explained by reference to the following illustrative Examples.

EXAMPLE 1

20 parts of a polyethylene-terephthalate (PET, No. CB-602, manufactured by Far East Textile CO., Taiwan, intrinsic viscosity (IV) of 0.80, measured in a mixture of phenol (60 wt %) and tetrachloroethane (40 wt %)), 100 parts of an acrylonitrile-butadiene-styrene copolymer (D-120, manufactured by Grand Pacific Taiwan), 10 parts of a compatibilizer (Benzoflex 352 manufactured by Velsicol Chemical Co., U.S.A.), 5 parts of a toughening agent (Kraton D-1300X, manufactured by Shell Co.) and 20 parts of carbon black (XC-72, manufactured by Cabot Co.,) were feeded through volumetric meters respectively to a twin-screw extruder of 54 mm φ (L/D=36), melted and then pelletized into conductive pellets. The output of said extruder was 100 Kg/hr, the pressure of the die head was maintained at 3–6 Mpa, and the temperature of each hot zone was held at 230–250° C. Since the pressure of the die head was duly controlled, the plastics strands were uniformly and smoothly extruded out so that the conductive peallets having a mean diameter and a mean length of about 3 mm respectively were obtainable.

After the conductive pellets were dried to an extent that the moisture contained had been below 100 ppm, they were supplied to a sub-extruder of a Barmag co-extruder and extruded through a T-DIE die head (temperature controlled at 255° C.) to form two layers as the surface layers. In addition, acrylonitrile-butadiene-styrene copolymer (D-100, manufactured by Grand Pacific Taiwan) was feeded to the main-extruder of the same Barmag co-extruder and extruded through the same T-DIE die head to form one layer as the substrate layer, which was between the two surface layers. The co-extruder was provided with a manifold device to ensure that the three layers were effectively separated, and the three layers were intimately laminated together when they ran out through the T-DIE die head. The T-DIE die head had a width of 1,380 mm and an exit gap of 0.8 mm. A three-layer sheet having a thickness of 0.32 mm was obtained, wherein the substrate layer was found to have a thickness of 0.22 mm and the two surface layers each were found to have a thickness of 0.04 mm.

The test results of the conductive three-layer sheet demonstrated that the surface resistance and the impact strength thereof were satisfactory, and the softening point thereof was 96° C. (measured according to ASTM D1525, under the load of 1 Kg), as shown in Table 1. For understanding the vacuum molded property of the sheet, it was molded by vacuum at 140° C. for 2 seconds to give a completely molded product. The resulting product was tested for surface resistance and the results were excellent, which showed that no increased surface resistance was observed after molded by vacuum. In other words, the surface resistance thereof was not affected by the molding of vacuum.

EXAMPLE 2

Similar composition and procedures were repeated as in Example 1, with the exception that in the conductive layer, 100 parts of said acrylonitrile-butadiene-styrene copolymer was replaced with polystyrene (PH-88H, manufactured by CHI MEI Taiwan) and 10 parts of said compatibilizer was replaced with EGMA-g-As (MOPY PA-A4400, manufactured by Nippon Yushi, Japan). The composition and test results are shown in Table 1.

EXAMPLE 3

Similar composition and procedures were repeated as in Example 1, with the exception that 20 parts of said polyethylene-terephthalate for the conductive layers were replaced by a copolyester (PETG 14471, intrinsic viscosity of 0.75, manufactured by Eastman Co., U.S.A.) and 10 parts of said compatibilizer were replaced by PS-PMMA (GP 305, Toagosei Chemical Industry Co., Japan). Additionally, 100 parts of said acrylonitrile-butadiene-styrene copolymer for the substrate layer were replaced by a polystyrene (PH-88H, manufactured by CHI MEI Taiwan). The composition and test results are shown in Table 1.

EXAMPLE 4

Similar composition and procedures were repeated as in Example 1, with the exception that said acrylonitrile-butadiene-styrene copolymer for the conductive layers were replaced by a polystyrene (PH88H, manufactured by CHI MAEI Taiwan) and 5 parts of said toughening agent were replaced by SEBS (Kraton G-1652, manufactured by Shell Co. U.S.A.). Additionally, 100 parts of said acrylonitrile-butadiene-styrene copolymer for the substrate layer were replaced by a polystyrene (PH-88H, manufactured by CHI MEI Taiwan). The composition and test results are shown in Table 1.

EXAMPLE 5

Similar composition and procedures were repeated as in Example 4, with the exception that 5 parts of said toughening agent were replaced by a thermoplastic polyester elastomer (Hytrel 4078, manufactured by Du Pont, U.S.A.) and 100 parts of said polystyrene for the substrate layer were replaced by a copolyester (PETG 14471, intrinsic viscosity of 0.75, a product of Eastman, U.S.A.). The composition and test results are shown in Table 1.

EXAMPLE 6

Similar composition and procedures were repeated as in Example 1, except the compatibilizer was not used. A conductive sheet was produced according to the procedures and conditions as in Example 1 and it was found that part of the conductive layers had been stripped off and separated from the substrate layers and the impact strength thereof had become worse. The composition and test results are shown in Table 1.

EXAMPLE 7

Similar composition and procedures were repeated as in Example 4, except the toughening agent was not used. A conductive sheet was produced according to the procedures and conditions as in Example 1 and it was found from the test results that the impact strength thereof had become worse and the product was brittle. The composition and test results are shown in Table 1.

The foregoing disclosure and description of the invention is illustrative and explanatory thereof, and various changes and modifications may be made therein without departing from the invention. All such changes and modifications are intended to be within the spirit and scope of this invention.

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
| Composition | Conductive Layer | Polyester | 20 | 20 | 20 | 20 | 20 | 20 | 20 |
|  |  | ABS | 100 | 0 | 100 | 0 | 0 | 100 | 0 |
|  |  | PS | 0 | 100 | 0 | 100 | 100 | 0 | 100 |
|  |  | Carbon Black | 20 | 20 | 20 | 20 | 20 | 20 | 20 |

TABLE 1-continued

|  |  |  | Ex. 1 | Ex. 2 | Ex. 3 | Ex. 4 | Ex. 5 | Ex. 6 | Ex. 7 |
|---|---|---|---|---|---|---|---|---|---|
|  |  | Compatibilizer | 10 | 10 | 10 | 10 | 10 | 0 | 10 |
|  |  | Toughening Agent | 5 | 5 | 5 | 5 | 5 | 5 | 0 |
|  | Substrate | ABS | 100 | 100 | 0 | 0 | 0 | 100 | 0 |
|  |  | PS | 0 | 0 | 100 | 100 | 0 | 0 | 100 |
|  |  | Polyester | 0 | 0 | 0 | 0 | 100 | 0 | 0 |
| Test Result | Flow index of Conductive Layer (g/10 min) |  | 12 | 25 | 10 | 25 | 22 | 8 | 34 |
|  | Impact Strength (g/mm) |  | 810 | 730 | 600 | 560 | 850 | 180 | <50 |
|  | Surface Resistance (ohm) |  | $5 \times 10^4$ | $3 \times 10^4$ | $6 \times 10^4$ | $3 \times 10^4$ | $2 \times 10^4$ | $5 \times 10^4$ | $4 \times 10^4$ |
|  | Surface Resistance after Vacuum Molding (ohm) |  | $9 \times 10^4$ | $5 \times 10^4$ | $8 \times 10^4$ | $7 \times 10^4$ | $4 \times 10^4$ | $7 \times 10^4$ | $8 \times 10^4$ |
|  | Softening Point (° C.) |  | 96 | 94 | 95 | 93 | 86 | 96 | 94 |

We claim:

1. A conductive polyester-based alloy sheet comprising three layers laminated together by co-extrusion, which comprises one substrate layer and two surface layers, said substrate layer being formed by acrylonitrile-butadiene-styrene copolymer and/or polystyrene, a toughening agent being incorporated to increase the toughness and control the flow index to a value greater than 5.0 g/10 min, measured under the load of 10 Kg and at a temperature of 250° C. if said substrate layer is formed by polystyrene, said surface layers each containing carbon black and acting as conductive layers, said surface layers each comprising:

(a) 99.9–0.1 wt % of a crystalline or non-crystalline polyester or copolyester resin having an intrinsic viscosity in a range of 0.4–1.2 and a melting point in a range of 200–300° C., the polyester being a monomer linked polyester selected from the group consisting of polybutylene-terephthalate, polyethylene-terephthalate, and polycyclohexane-dimethylene-terephthalate, the copolyester being synthesized by reacting a diol with a dicarboxylic acid:

(i) the diol being selected from the group consisting of ethanediol, 1,4-butanediol, 1,5-pentanediol, 1,6-hexanediol, diglycol, 1,4-dimenthylol-cyclohexane, 3-methyl-pentanediol, and 2-methyl-hexanediol; and (ii) the dicarboxylic acid being selected from the group consisting of malonic acid, succinic acid, glutaric acid, adipic acid, pimelic acid, suberic acid, azelaic acid, sebacic acid, cyclohexanecarboxylic acid, terephthalic acid, and isophthalic acid;

(b) 0.1–99.9 wt % of a acrylonitrile-butadiene-styrene copolymer or polystyrene;

(c) 0.1–30 wt % of a compatibilizer, based on the weight of (a)+(b), said compatibilizer being selected from the group consisting of ethylene glycidyl methacrylate-acrylonitrile styrene polymer, polystyrene-poly methyl methacrylate or 1,4-cyclohexane dimethanol dibenzoate, and has a softening point of between 30–120° C.;

(d) 0.1–20 wt % of a toughening agent, based on the weight of (a)+(b), said toughening agent selected from the group consisting of styrene-butadiene-styrene, styrene-ethylene-butadiene-styrene resin, or a thermoplastic polyester elastomer; and (e) 3–25 wt % of carbon black, based on the weight of (a)+(b);

said conductive layers having a surface resistance of not more than $10^8$ ohms.

* * * * *